United States Patent

Hunt

[11] 4,147,305
[45] Apr. 3, 1979

[54] SPRAY DRAWBAR

[76] Inventor: Larry L. Hunt, Rural Route, Hartford, Iowa 50118

[21] Appl. No.: 832,397

[22] Filed: Sep. 12, 1977

[51] Int. Cl.² .............................................. B05B 1/20
[52] U.S. Cl. .................... 239/167; 172/271; 172/311; 172/386
[58] Field of Search ............... 239/155, 163, 166, 167, 239/168, 178, 212, 213; 16/35 R; 172/271, 311, 386, 456

[56] References Cited

U.S. PATENT DOCUMENTS

| | | | |
|---|---|---|---|
| 2,575,521 | 11/1951 | Ireland | 239/168 |
| 2,645,523 | 7/1953 | Long | 239/167 |
| 2,657,949 | 11/1953 | Morrison | 239/167 |
| 2,690,355 | 9/1954 | Waters et al. | 239/168 |
| 2,973,818 | 3/1961 | Marvin | 172/456 UX |
| 3,107,055 | 10/1963 | Palmer | 239/167 X |
| 3,814,320 | 6/1974 | Skurray | 239/168 X |

FOREIGN PATENT DOCUMENTS

| | | | |
|---|---|---|---|
| 824514 | 10/1969 | Canada | 239/178 |
| 204828 | 1/1968 | U.S.S.R. | 239/168 |
| 436872 | 10/1935 | United Kingdom | 239/168 |

*Primary Examiner*—Johnny D. Cherry
*Attorney, Agent, or Firm*—Zarley, McKee, Thomte, Voorhees & Sease

[57] ABSTRACT

An extendible, collapsible spray drawbar device is disclosed comprising a triangular shaped frame structure adapted at the forward apex end for pivotal attachment to a prime mover and having wheels at the rear base end, transverse spray bar elements pivotally mounted to and extending from the base of the frame structure, wheels pivotally mounted to the outer end of the spray bar element, extension bar elements hingedly mounted to the outer end of the spray bar elements, and support elements pivotally mounted at one end to the transverse spray bar element and pivotally mounted at the other end about a horizontal and vertical axis to a brace member transversely extending across the triangular shaped frame structure. During the spraying operation, the transverse spray bar elements and the extension bar elements extend linearly from the base of the triangular shaped frame structure. For transportation, the support elements detach from the transverse brace and pivot toward the transverse spray bar element, the transverse spray bar elements and extension bar elements pivot rearwardly to a position approximately perpendicular to the base of the triangular shaped frame structure, and the wheels of the transverse spray bar element pivot 90° so as to be parallel to the wheels of the frame structure. The operational position of the spray drawbar provides spray bar reach across many rows while the transportation configuration provides an implement having a width generally less than the wheel span of a prime mover.

6 Claims, 8 Drawing Figures

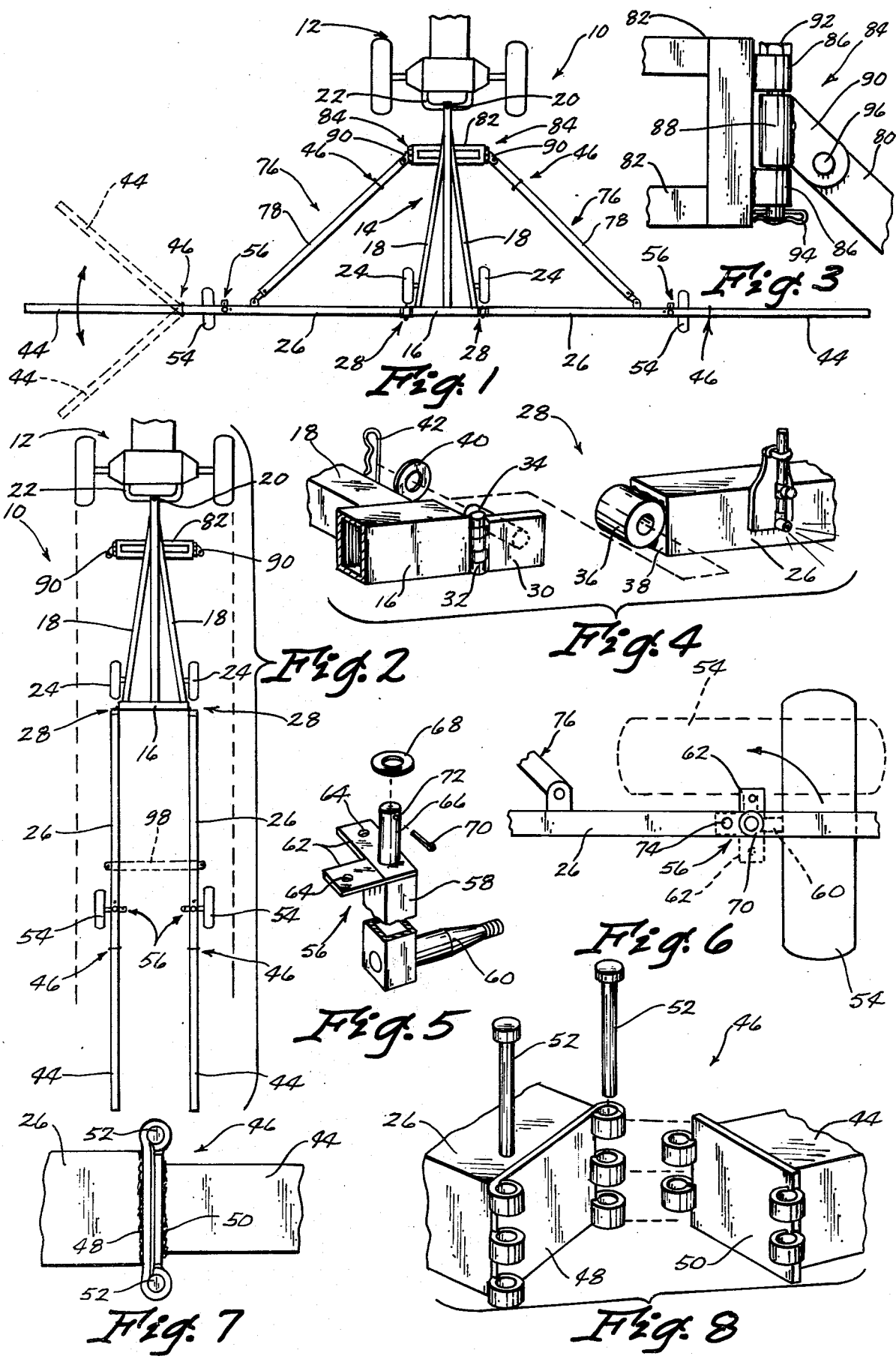

SPRAY DRAWBAR

BACKGROUND OF THE INVENTION

This invention relates to spray drawbars and more particularly to an extendible, collapsible spray drawbar that provides great spray bar reach to cover many rows and easily collapses to a narrow width transporting configuration.

Prior spray drawbars did not provide the extensive spray bar outreach necessary to cover many rows and did not easily collapse into a convenient transporting configuration.

SUMMARY OF THE INVENTION

An extendible, collapsible spray drawbar is disclosed comprising a triangular shaped frame structure adapted at the forward apex end for pivotal attachment to a prime mover and having wheels at the rear base end, transverse spray bar elements pivotally mounted at one end to the base of the frame structure and hingedly mounted at the other end to extension bar elements, wheels pivotally mounted to the outer end of the spray bar elements, and support elements pivotally mounted at one end to the transverse spray bar elements and pivotally mounted about a horizontal and vertical axis at the other end to a brace element transversely extending from the frame structure. During the spraying operation, the transverse spray bar elements and extension bar elements are in linear alignment with and extend from the base of the frame structure to support the spraying mechanism. The extension bar elements, transverse spray bar elements, and frame structure base provide an extensive spray bar reach. For transporting the spray bar device, the support elements easily detach from the transverse brace by removing a pivot pin and pivot toward the transverse spray bar elements. The extension bar elements and the transverse spray bar elements pivot rearwardly about the pivotal connection to the frame structure base so as to be perpendicular to that base. The wheels attached to the transverse spray bar elements pivot 90° so as to be parallel to the wheels attached to the frame structure and are pin locked in that position. The spray bar device collapses to a transporting configuration having a width generally less than the axle of a prime mover.

It is a principal object of this invention to provide a collapsible spray drawbar that provides extensive spray bar reach to cover many rows.

A further object of the invention is to provide a spray drawbar that easily and simply collapses to a transporting configuration having a width less than a prime mover.

A still further object of the invention is to provide a collapsible spray drawbar that provides extensive spray bar reach over many rows and will not bind or twist when used on non-planar terrain.

A still further object of the invention is to provide a spray drawbar device that is economical to manufacture and durable in use.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims and illustrated in the accompanying drawings in which FIG. 1 is a top plan view of the device in an operational mode and attached to a prime mover.

FIG. 2 is a top plan view similar to FIG. 1 with the device in a collapsed transporting position.

FIG. 3 is an enlarged plan view of a pivotal joint.

FIG. 4 is an enlarged partially exploded view of another pivotal joint.

FIG. 5 is an enlarged partially exploded view of the wheel axle connection.

FIG. 6 is an enlarged partial top view illustrating the pivotal movement of the wheel.

FIG. 7 is a partial top plane view of a hinged joint.

FIG. 8 is an enlarged partially exploded view of the hinge joint of FIG. 7.

DESCRIPTION OF THE PREFERRED EMBODIMENT

The numeral 10 refers to the spray bar device shown in FIG. 1 pivotally attached to prime mover 12.

Spray drawbar device 10 is comprised of a rigid triangular shaped frame structure 14 having base member 16 securely attached to side members 18 with the forward apex end of frame structure 14 pivotally connected by pin 20 to drawbar 22 of prime mover 12 as shown in FIG. 1. Wheels 24 are attached to side members 18 just forward of base member 16.

Transverse spray bar elements 26 are pivotally connected to base member 16 by pivot assembly 28 shown in FIG. 4. Pivot assembly 28 comprises plate 30 pivotally attached to base member 16 by hinge 32, rod 34 securely mounted to the face of plate 30, and sleeve 36 securely mounted to the end 38 of spray bar element 26. Rod 34 is received by sleeve 36 and secured thereto by washer 40 and clip 42 as depicted in FIG. 4. Pivot assembly 28 provides a secure pivotal connection of spray bar elements 26 to base member 16 such that spray bar elements 26 may pivot from a position of linear alignment with base member 16 as shown in FIG. 1 to a position approximately perpendicular to base member 16 as shown in FIG. 2. Spray bar elements 26 however, are easily detached from base member 16 by removing clip 42 and washer 40 and sliding sleeve 36 off of rod 34.

Extension bar elements 44 are hingedly attached to transverse spray bar elements 26 to provide further spray bar reach as shown in FIG. 1. Extension bar elements 44 are hingedly connected to spray bar elements 26 by hinge 46 as shown in FIGS. 7 and 8. Hinge 46 comprises hinge plate 48 securely attached to spray bar elements 26, hinge plate 50 securely attached to extension bar elements 44 and shear pins 52 connecting plate 48 to plate 50. Hinge 46 provides protection against damage to extension bar elements 44 upon accidental striking of immovable objects. Should extension bar elements 44 strike an object while moving either forward or in reverse, one of the pins 52 will shear allowing extension bar element 44 to pivot about the other pin 52 as illustrated in FIG. 1. Hinge 46 also allows bar elements 44 to be easily detached from spray bar elements 26 by removing shear pins 52 and disengaging hinge plate 50 from hinge plate 48.

Wheels 54 are pivotally attached to transverse spray bar elements 26 by wheel assembly 56 shown in FIG. 5. Wheel assembly 56 comprises shaft 58 attached to axle 60 of wheels 54, L-shaped plate 62 having pin apertures 64 securely attached to the end of shaft 58 and rod 66 securely mounted to plate 62. Rod 66 is received through an aperture (not shown) in transverse spray bar elements 26 and secured thereto by washer 68 and cotter pin 70 being received by aperture 72 of rod 66. Pin 74 is selectively received by one of the apertures 64 of plate 62 and an aperture (not shown) through transverse spray bar elements 26 to lock wheel 54 in a position perpendicular to spray bar element 26 or parallel to spray bar element 26. Wheel 54 is secured in a position perpendicular to spray bar element 26 as shown in FIGS. 1 and 6 during the spraying operation. To transport the spray drawbar device 10, pin 74 is removed from aperture 64 and spray bar element 26, wheel 54 is pivoted to a position parallel to spray bar element 26 as depicted in FIG. 6, and pin 74 is inserted in aperture 64 and the aperture (not shown) of spray bar element 26 to lock wheels 54 in place.

Support is given to transverse spray bar element 26 by support structure 76 shown in FIG. 1. Support structure 76 is comprised of support element 78 and support element 80 hingedly connected by hinge assembly 46. Support element 78 is pivotally connected to transverse spray bar element 26 in a conventional manner. Support element 80 is pivotally connected to transverse brace 82 by a dual pivot assembly 84 shown in FIG. 3. Transverse brace 82 is securely mounted to triangular shaped frame structure 14. Dual pivot assembly 84 allows support structure 76 to pivot about a horizontal axis and a vertical axis and comprises sleeves 86 securely mounted to transverse brace 82, hinge sleeve 88 securely attached to ear 90, pivot pin 92 being received by hinge sleeves 86 and 88, and retaining pin 94 holding pivot pin 92 in place as shown in FIG. 3. Pivot pin 92 being received by hinge sleeves 86 and 88 provides the pivotal movement about the horizontal axis while the pivotal connection of ear 90 to support element 80 by means of pivot pin 96 provides the pivotal movement about the vertical axis. The dual pivotal movement of assembly 84 alleviates binding and twisting when spray draw bar device 10 is used in uneven terrain.

Spray draw bar device 10 is easily and quickly collapsible from its operating position (FIG. 1) to its transporting position (FIG. 2) having a transporting width substantially less than the axle length of prime mover 12. To collapse spray draw bar device 10 to its transporting position, support element 78 is detached from support element 80 by removing shear pins 52, support element 80 is detached from transverse brace 82 by removing pivot pin 92, support element 78 may either be rotated against transverse spray bar element 26 and secured thereto or detached from spray bar element 26, spray bar element 26 is rotated rearwardly so as to be approximately perpendicular to base member 16, pin 74 is removed from wheel assembly 56 and wheel 54 is pivoted so as to be parallel to wheels 24, pin 74 is reinserted to secure wheels 54 in that position, and stabilizer strap 98 is connected between the parallel transverse spray bar elements 26 to provide stability during transportation. As can be seen, spray drawbar device 10 permits great spray bar lengths to be utilized, resists bending and twisting over uneven terrain, and easily collapses for transportation. Thus, this invention accomplishes at least all of its stated objectives.

I claim:

1. A collapsible spray drawbar device, comprising, a frame means having a forward end and a rearward end, said forward end being adapted for pivotal connection to a prime mover, first wheel means mounted to said frame means for engagement with the ground, a pair of spray bar elements connected to said rearward end of said frame means at laterally spaced apart positions, each spray bar element connected for pivotal movement between an operating position wherein said spray bar element is extended transversely from said frame means and a transporting position wherein said spray bar element is extended approximately parallel to the longitudinal axis of said frame means, a pair of second wheel means, each mounted to a respective one of said spray bar elements for engagement with the ground, a pair of extension bar elements, each said extension bar element pivotally and detachably mounted to a respective one of said spray bar elements so as to be a linear extension of said spray bar elements, each said extension bar element being mounted to said respective spray bar element by hinge means, said hinge means being a double-jointed hinge pivotally connected by shear pins so that said extension bar element pivots about said hinge means upon striking an immovable object, and a pair of support bar elements, each said support bar element detachably and pivotally mounted to said frame means and to a respective one of said spray bar elements.

2. The device of claim 1 further comprising a stabilizer strap for connecting together said spray bar elements in the parallel transporting position with said stabilizer strap having opposite ends adapted for connection to said spray bar elements to provide stability during transportation.

3. The device of claim 1 wherein each said second wheel means comprises an axle, a ground wheel rotatably supported on said axle, means for supporting said axle on one of said spray bar elements for pivotal movement between an operating position directed generally parallel to said spray bar element and a transporting position directed generally perpendicular to said spray bar element and means for selectively fixing said axle in said operating and transporting positions.

4. The device of claim 3 wherein said means for supporting said axle includes an upright shaft rigidly connected to said axle and pivotally connected to one of said spray bar elements, said means for selectively fixing said axle including a plate securely attached to said shaft, said spray bar element having an aperture therein and said plate having spaced apart pin apertures positioned for registration with said spray bar aperture when said axle is in the operating and transporting positions therefor respectively, and a pin selectively received by a registered pair of said apertures to lock said axle in one of the operating and transporting positions therefor.

5. The device of claim 1 wherein said double-jointed hinge includes a first hinge plate securely attached to one of said spray bar elements, a second hinge plate securely attached to one of said extension bar elements and a pair of coacting shear pin receiving means on said first and second hinge plates at transversely spaced apart positions relative to the longitudinal axis of said spray bar element whereby said double-jointed hinge acts as a fracturable rigid connection when a pair of shear pins are received therein.

6. The device of claim 1 wherein each said support bar element comprises first and second support members having first and second ends, with said second end of said first support member detachably mounted to said first end of said second support member, said first end of said first support member pivotally mounted to said respective spray bar element, and said second end of said second support member pivotally attached to said frame means so as to pivot about a vertical and a horizontal axis, said second end of said first support member being detachably mounted to said first end of said second support member by a double-jointed hinge including shear pins for a fracturable rigid connection between said first and second support members.

* * * * *